us

United States Patent [19]

Pearson et al.

[11] Patent Number: 5,988,455
[45] Date of Patent: *Nov. 23, 1999

[54] LATEX AEROSOL PAINT PRODUCTS

[75] Inventors: Paul D. Pearson, Diamond; Patricia L. Redding, South Euclid, both of Ohio

[73] Assignee: The Sherwin-Williams Company, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/923,770

[22] Filed: Sep. 2, 1997

Related U.S. Application Data

[63] Continuation of application No. 08/626,617, Apr. 1, 1996, abandoned, which is a continuation of application No. 08/357,902, Dec. 16, 1994, abandoned.

[51] Int. Cl.$^6$ .............................. B65D 83/14; C08K 5/06
[52] U.S. Cl. ........................ 222/402.1; 222/635; 524/366; 524/378; 524/561; 524/903
[58] Field of Search ........................... 222/635, 402.1; 524/378, 903, 561, 366

[56] References Cited

U.S. PATENT DOCUMENTS

| | | | |
|---|---|---|---|
| 2,070,167 | 2/1937 | Iddings | 167/13 |
| 2,475,542 | 12/1949 | Golden | 260/8 |
| 2,524,590 | 10/1950 | Boe | 252/305 |
| 2,972,592 | 2/1961 | Brown et al. | 260/27 |
| 3,025,252 | 3/1962 | Jack | 260/23 |
| 3,079,358 | 2/1963 | Uelzmann | 260/29.7 |
| 3,096,001 | 7/1963 | Boe et al. | 222/135 |
| 3,207,386 | 9/1965 | Presant et al. | 222/394 |
| 3,280,050 | 10/1966 | Johnson et al. | 260/17 |
| 3,280,059 | 10/1966 | Giesen | 260/23.7 |
| 3,305,510 | 2/1967 | Gander | 524/378 |
| 3,305,511 | 2/1967 | Gander | 524/378 |
| 3,305,512 | 2/1967 | Gander | 524/378 |
| 3,305,513 | 2/1967 | Gander | 260/33.2 |
| 3,308,036 | 3/1967 | Zdanowski | 117/138.8 UA |
| 3,308,078 | 3/1967 | Rogers et al. | 260/27 |
| 3,320,196 | 5/1967 | Rogers | 260/27 |
| 3,328,325 | 6/1967 | Zdanowski | 260/22 |
| 3,328,328 | 6/1967 | Scanley | 260/28.5 |
| 3,343,718 | 9/1967 | Siegel | 222/1 |
| 3,413,254 | 11/1968 | Gander | 260/33.2 |
| 3,419,506 | 12/1968 | Gander | 260/2.5 |
| 3,457,208 | 7/1969 | Sullivan et al. | 260/28.5 |
| 3,467,610 | 9/1969 | Flarman et al. | 260/22 |
| 3,470,054 | 9/1969 | Tyrrell | 156/210 |
| 3,481,889 | 12/1969 | Gibsen | 260/17.4 |
| 3,547,950 | 12/1970 | Gander | 260/33.2 |
| 3,573,239 | 3/1971 | Zdanowski | 260/22 |
| 3,697,466 | 10/1972 | Sullivan et al. | 260/29.6 TA |
| 3,705,670 | 12/1972 | Cox et al. | 222/394 |
| 3,740,366 | 6/1973 | Sanderson et al. | 260/29.6 M |
| 3,900,438 | 8/1975 | Zdanowski et al. | 260/28.5 R |
| 3,925,282 | 12/1975 | Davis et al. | 260/23 H |
| 3,955,997 | 5/1976 | Sagane et al. | 106/131 |
| 4,001,159 | 1/1977 | Imai et al. | 524/378 |
| 4,014,841 | 3/1977 | Taub | 260/29.6 MN |
| 4,056,500 | 11/1977 | Stern | 260/29.6 MN |
| 4,062,823 | 12/1977 | Cheung et al. | 260/29.4 UA |
| 4,066,596 | 1/1978 | Stern | 222/635 |
| 4,111,881 | 9/1978 | Paul | 524/378 |
| 4,133,790 | 1/1979 | Sekmakas et al. | 260/29.6 NR |
| 4,147,566 | 4/1979 | Leonard | 148/6.25 R |
| 4,154,618 | 5/1979 | Burke | 106/27 |
| 4,187,204 | 2/1980 | Howard | 260/22 CB |
| 4,265,797 | 5/1981 | Suk | 260/29.6 E |
| 4,362,838 | 12/1982 | Leep et al. | 524/444 |
| 4,363,887 | 12/1982 | Leep | 523/482 |
| 4,365,028 | 12/1982 | Leep et al. | 523/402 |
| 4,384,661 | 5/1983 | Page et al. | 222/394 |
| 4,420,575 | 12/1983 | Rapaport et al. | 523/504 |
| 4,432,797 | 2/1984 | Vasishth et al. | 106/34 |
| 4,450,253 | 5/1984 | Suk | 524/378 |
| 4,482,662 | 11/1984 | Rapaport et al. | 523/504 |
| 4,894,397 | 1/1990 | Morgan et al. | 523/201 |
| 4,968,735 | 11/1990 | Page et al. | 524/55 |
| 5,071,900 | 12/1991 | Page et al. | 524/378 |

FOREIGN PATENT DOCUMENTS

| | | | |
|---|---|---|---|
| 1125142 | 8/1968 | United Kingdom | 524/378 |
| 2028364 | 3/1980 | United Kingdom . | |

OTHER PUBLICATIONS

Sciara, Aerosol Paint Propellants, Paint and Varnish Production (1963).
Bohnenn, Dimethylether Pure, Aerosol Age, p. 26 (Jan. 1981) and p. 42 (Feb. 1981).
B.F. Goodrich—Carbopol Water Soluble Resins (no date).
B.F. Goodrich—Chemical and Industrial Specialties—Carbopol Resins (no date).
Johnson Wax—Joncryl 537 (1982).
Johnson Wax—Joncryl 77 (1979).
Johnson Wax—Joncryl 74F (1984).
Continental Group—Conoweld II (Oct. 1984).
Rohm & Haas Company—Acrysol 527 (no date).
Rohm & Haas Company—Floor Polishes—Rhoplex B–832 (Feb. 1983).
Rohm & Haas Company—Floor Polishes—Rhoplex B505 (Aug. 1980).
Rohm & Haas Company—Floor Polishes—Rhoplex B–1604 (Apr. 1982).
Rohm & Haas Company—Floor Polishes—Experimental Emulsion E–1821 (Apr. 1983).
Rohm & Haas Company—Floor Polishes—Experimental Emulsion E–1876 (Apr. 1983).
Rohm & Haas Company—Graphic Arts—Acrysol—ASE—60 (Jun. 1978).
Rohm & Haas Company—Industrial Coatings—Acryloid WR—748 (Nov. 1983).
Rohm & HaasCompany—Industrial Coatings—Acrysol WS—32; Acrysol WS—50 (Jun. 1983).

(List continued on next page.)

*Primary Examiner*—Jeffrey T. Smith
*Attorney, Agent, or Firm*—Robert E. McDonald; Heidi A. Boehlefeld; Vivien Y. Tsang

[57] ABSTRACT

The present invention relates to water-based, latex aerosol paint compositions.

12 Claims, No Drawings

OTHER PUBLICATIONS

Rohm & Haas Company—Building Products—Acrysol I–62 (May 1983).

Rohm & Haas Company—Industrial Coatings—Rhoplex WL—91 (Aug. 1983).

Rohm & Haas Company—Floor Polishes—Rhoplex WL—91 (Sep. 1981).

Rohm & Haas Company—Floor Polishes—Acrysol 644 (Feb. 1992).

Rohm & Haas Company—Textile Chemicals—Acrysol ASE Thickeners (Nov. 1981).

Rohm & Haas Company—Paper Chemicals—Acrysol Thickeners for Paper Products (Dec. 1981).

Rohm & Haas Company—Adhesives—Acrysol Thickeners for Adhesives (Mar. 1982).

Rohm & Haas Company—Experimental Thickener E–1615 (Jan. 1979).

Rohm & Haas Company—Experimental Emulsion E–1615 in Pigment Printing (Oct. 1978).

Rohm & Haas Company—Emulsion E–2014 PMN (May 1983).

Rohm & Haas Company—Acrysol ASE–60 (Aug. 1974).

Paint—vol. 16 (pp. 742–761) (no date avail).

LATEX AEROSOL PAINT PRODUCTS

This application is a continuation of application Ser. No. 08/626,617 filed on Apr. 01, 1996 now abandoned, which was, in turn, a continuation of Ser. No. 08/357,902 filed on Dec. 16, 1994, now abandoned.

BACKGROUND OF THE INVENTION

Previously, aerosol paint products were organic solvent-based, and thus were generally highly flammable, toxic and/or environmentally unfriendly; or were dispensed by propellants such as fluorocarbons and chlorofluorocarbons that were suspected of depleting the earth's ozone layer.

More recent developments in the aerosol dispensed paint products area have included attempts to develop non-flammable and non-ozone depleting products. Generally, such attempts have used water-based polymer systems and dimethyl ether propellants. For example, U.S. Pat. No. 4,265,797 teaches an aerosol paint formulation comprising a propellant such as n-butane, isobutane, propane, ethane or dimethyl ether and a water-based concentrate containing a film-forming acrylic polymer and a lower monohydric alcohol. Additionally, U.S. Pat. No. 4,384,661 teaches an aerosol water-based paint composition comprised of an aqueous emulsion of a film-forming polymer which is emulsified into an aqueous solution of dimethyl ether using a nonionic surfactant. U.S. Pat. Nos. 4,968,735 and 5,071,900 teach water-based aerosol paint compositions which use dimethyl ether as a propellant and which require a particular type of aqueous thickener.

It is very difficult to formulate a water-based aerosol paint composition which is stable in the can, low in flammability, low in ozone depletion, easily sprayed, produces a uniform, glossy surface and which does not run or drip from the substrate. Prior art attempts to formulate water-based, low flammability, low ozone depleting aerosol paints have suffered from at least one or more of the above deficiencies.

The present invention teaches a water-based latex aerosol composition which is stable in the can, lower in flammability than organic solvent based systems, low in ozone depletion, is easily sprayed, produces a uniform, glossy surface, and which does not exhibit unacceptable run or drip from the surface. All of this is accomplished without the use of any added thickener to the aerosol composition. The present invention is clearly an improvement over the prior attempts to formulate water-based aerosol paints.

SUMMARY OF THE INVENTION

The present invention comprises a water-based latex aerosol paint composition which is stable in the can, lower in flammability than organic solvent based systems, low in ozone depletion, is easily sprayed, produces a uniform, glossy surface, and which does not exhibit unacceptable run or drip from the surface. This is accomplished without the use of any added thickener to the aerosol composition. In particular, the present invention comprises a pressurized aerosol paint product comprising a container, said container comprising a can, a valve cup and valve assembly, a dip tube and an actuator; a composition within said container, said composition comprising a water-based latex resin composition; and a propellant within said container; said propellant preferably comprised of dimethyl ether.

DETAILED DESCRIPTION OF THE INVENTION

The paint concentrate of this invention comprises a latex film-forming polymer and water. Suitable latexes are prepared using well-known emulsion polymerization techniques. However, not all latexes are suitable to be dispensed from a pressurized container such as an aerosol can. The vast majority of latexes which may be otherwise suitable for use as house paint and the like are either not stable in a pressurized environment with a propellant such as dimethyl ether or do not spray acceptably from a pressurized can. Our research has led us to a very distinct class of latex polymers which are especially suitable in dimethyl ether propelled aerosol paint compositions. This type of polymer does not require the use of an additional thickener to regulate the film properties of the polymer after it has been sprayed onto the substrate. The latex polymers preferred for use in the present invention are referred to as core-shell latex polymers. A class of latex polymers known as inverted core-shell latex polymers is especially preferred for use herein. A core-shell latex polymer is one in which polymerization of the polymer takes place in two stages. A first polymer is produced using emulsion polymerization techniques after which a second stage of monomers is added and polymerized. Core-shell latexes are formed when the second stage polymer forms as a "shell" or coating around a discrete domain or "core" of first stage polymer. Inverted core-shell latexes are those where the second stage polymer becomes the core domain and is encapsulated by the shell first stage polymer. This can be accomplished by selecting monomers such that the first stage polymer is more hydrophilic than the second stage polymer. Inverted core-shell polymers are taught by Lee and Ishikawa in "The Formation of Inverted Core-Shell Latexes", J. Poly. Sci. 21, 147–154 (1983) which is incorporated herein by reference.

The process of preparing a latex emulsion suitable for use herein comprises preparing a hydrophilic, low molecular weight first stage polymer by emulsion polymerization and conducting a second emulsion polymerization to produce a hydrophobic second stage polymer under conditions sufficient to cause the second stage polymer to partition into the first stage polymer thus producing an inverted core-shell latex. The pH of the latex is then adjusted to dissolve the first stage polymer into the continuous aqueous phase thereby producing a continuous phase of water and first stage polymer and a discontinuous phase of discrete stabilized particles of second stage polymer.

The term "hydrophilic" is used herein to mean that the polymer can be dissolved in water or an aqueous carrier upon adjustment of the pH. Polymers containing acid functional groups can be solubilized by the addition of alkali. Polymers containing basic functional groups are solubilized by the addition of acid. The term "hydrophobic" is used herein to mean a polymer which does not dissolve in water or an aqueous carrier upon pH adjustment.

Emulsion polymerization, as used herein, means the process of producing a polymer using comonomers, initiator and water as the continuous phase. The process may also use chain transfer agents to control molecular weight, catalysts for the promotion of free radical generation and polymerization and crosslinking agents.

The first step in emulsion polymerization is the selection of the monomers used to create the first stage polymer. The monomers should be selected to include at least one monomer which would produce a water insoluble polymer and at least one monomer capable of contributing a functional group to the polymer. Typical monomers for producing water insoluble polymers are vinyl monomers, monovinyl aromatic monomers such as ortho-, meta- and para-methyl styrene, α-methylstyrene, tertiary butylstyrene, styrene, ortho-, meta- and para-ethyl styrene, chlorostyrenes, bromostyrenes, vinylnaphthalenes, and mixtures thereof; acrylic and methacrylic esters, including methyl methacrylate, 2-ethyl hexylacrylate, butyl acrylate, butyl methacrylate, hydroxy functional acrylates such as 2-hydroxyethyl acrylate and methacrylate, methylol acrylamide, glycidyl acrylate and methacrylate, and the like; and conjugated dienes such as 1,3-butadiene, 2-methyl-1,3-butadiene, 2,3-dimethyl-1,3-butadiene, pentadiene, 2-neopentyl-1,3-butadiene, substituted dienes such as 2-chloro-1,3-butadiene, 2-cyano-1,3-butadiene, substituted straight chain conjugated pentadienes, hexadienes, and mixtures thereof. A minor portion of this component can be substituted with relatively soluble vinylic monomers such as vinyl acetate and methyl acrylate.

The monomers capable of contributing a functional group to the polymer can have either basic or acid functionality. Typical acid group containing monomers include acrylic acid, methacrylic acid and other unsaturated acid monomers such as maleic acid, crotonic acid, fumaric acid, itaconic acid, vinyl benzoic acid and isoprenyl benzoic acid. Typical basic group containing monomers include vinyl pyridines and amino acrylates and amino methacrylates.

The preferred monomers capable of contributing a functional group to the polymer are acrylic acid and methacrylic acid either with or without additional minor proportions of other acid containing monomers.

Selecting monomers for the first stage of an inverted core shell latex should take into account the film properties desired in the end composition. Glass transition temperature, Tg, of the first stage polymer will be important and selection of the monomers should be made with resulting Tg in mind. It is critical to produce a first stage polymer which is hydrophilic. To do so a ratio of monomers which would otherwise produce an insoluble polymer to monomers capable of contributing a functional group of between about 10:1 to about 1:3, preferably between about 7:1 to about 3:2 is used. One preferrred first stage monomer composition is a ratio of about 3 to 1 α-methylstyrene to acrylic acid.

A chain transfer agent can be used to regulate the molecular weight of the polymer. Preferably, molecular weight should be less than about 25,000, more preferably below about 15,000. In general, the more chain transfer agent used, the slower the polymerization rate and the higher the amount of free monomer in the polymer composition. To minimize these attributes, no more than about 10 mole percent (based on total moles of monomer charged) should be used. Chain transfer agents, when used, are generally added along with the monomer feeds as is customary in emulsion polymerization reactions. Conventional chain transfer agents for use in latex polymer production, such as mercapto-containing chain transfer agents, are well-known and can be used in the present invention.

An initiator such as ammonium persulfate is used to generate free radicals for the emulsion polymerization.

The selection of monomers used to make the second stage polymer is likewise important. The monomers can be selected from the same group of monomers used to create the first stage polymer, however, their types and amounts must be selected so as to prepare a polymer which is not water soluble upon pH adjustment. Minimal amounts of functional group monomers should be used, if at all. The second stage polymer must also be able to partition into the first stage polymer and thus, it must be relatively incompatible with the first stage polymer. Molecular weight of the second stage polymer is generally higher than that of the first stage polymer, typically up to about 200,000.

The ratio of first stage polymer to second stage polymer can vary widely between about 1:10 to about 10:1. Preferably, the ratio of first stage polymer to second stage polymer is between about 1:1 to about 1:10. In one preferred embodiment the ratio is 1:7.

A preferred selection of monomers for second stage polymer production comprises approximately 40–50% styrene, 15–25% 2-ethylhexyl acrylate and 25–35% methyl methacrylate.

The emulsion polymerization process for producing the core-shell latex is generally carried out at a temperature of between about 70° C. to about 90° C. The second stage polymerization is preferably carried out at a temperature above the Tg of the first stage polymer to promote encapsulation and shell formation by the first stage polymer.

Reaction conditions for the polymerization of the second stage polymer can be similar or the same as the conditions used for the first stage polymer. Chain transfer agents and intiators can likewise be similar. It may be desirable to adjust the pH of the first stage polymer prior to introduction of the second stage polymer to promote the inversion process.

Emulsion polymerization is generally carried out by dropwise addition of monomers and chain transfer agent to a reaction vessel containing water or other aqueous medium and initiator. Monomer addition for each stage is usually carried out over a period of time from about 0.5 hours to about 6 hours, generally between about 0.5 and 3.5 hours. After complete addition of the monomers, the reaction mixture is typically held at the reaction temperature for another 30 minutes to 1 hour.

Relatively few commercially available latex compositions have been found to be acceptable for use in the present invention. However, there are a number of commercially available latexes which would appear to be acceptable for use in the present invention. Joncryl® 537, an inverted core-shell latex commercially available from S.C. Johnson & Son, Inc., Racine, Wis., USA; a low odor version of Joncryl® 537 named SCX-2502 available from S.C. Johnson & Son; latexes known as Joncryl® 538, SCX-1520, and SCX-1530 all available from S.C. Johnson & Son; and Neocryl® 6037 commercially available from Zeneca Resins, Wilmington, Mass., USA all appear to be acceptable for use in the present invention.

Of the commercially available latex resins, Joncryl® 537 is most preferred. The continuous phase of Joncryl® 537, believed to be the first stage polymer of Joncryl® 537, is believed to comprise about 76 wt % α-methylstyrene and 24 wt % acrylic acid in water with polypropylene glycol. The relative amounts of polypropylene glycol to polymer is about 1:3. The dispersed phase of Joncryl® 537, believed to be the second stage polymer, is believed to be about 47 wt % styrene, 21 wt % 2-ethylhexyl acrylate and 32% methyl methacrylate. Neocryl® 6037 was specifically designed to be a direct replacement of Joncryl® 537 and C13 NMR analysis of Neocryl® 6037 versus Joncryl® 537 shows very similar compositional results. Joncryl® 537 is supplied at 46% solids level.

Interestingly, when using the inverted core-shell latexes taught above, the present invention does not require the additional thickeners such as those required by the prior art. The prior art used the thickeners to ensure vertical cling to the substrate which was sprayed. However, the mere presence of thickeners in the pressurized can can cause instability problems prior to spraying as well as mechanical problems during spraying. The present invention eliminates the need for additional thickeners, thus eliminating the in-can stability and spraying problems without sacrificing film cling properties.

To prepare a paint composition suitable for use in a pressurized aerosol paint composition, a concentrate is first prepared by charging the core-shell latex to a tank with pigment (if desired) and a grinding aid and a pH control agent such as 2-amino-2-methyl-1-propanol and a defoamer such as a polyglycol polysiloxane. Preferred grinding aids are AMP 95® commercially available from Angus Chemical and G-3300 from Stepan Chemical and a preferred defoamer is Nalco 2305 commercially available from Nalco Chemical Company. This mixture is ground on a mill to a value of 7 on the Hegman scale and then rinsed with a mixture of latex resin in deionized water. It is then let down, under agitation, with additional latex and paint industry standard additives such as coalescing solvents, plasticizers, defoamers, anticorrosion agents, and gloss enhancers. Flow control agents are generally added to control the flow and levelling properties of the paint.

Once prepared, the paint composition concentrate is further let down with reducing solvent, water, and generally a small amount of coalescing solvent after which it is filtered through a 10 micron filter bag to remove any large agglomerations. The let down solvents can play an important role in determining the spraying characteristics of the product as well as the compatibility of the paint with the propellant. Preferred solvents include lower alcohols, glycol ethers and water.

The paint composition can then be charged to an aerosol can and pressurized with propellant using procedures standard in the aerosol industry. For a description of such procedures, U.S. Pat. No. 5,340,871 is incorporated herein by reference.

The selection of the valve, dip tube and actuator used to spray the compositions taught herein is of importance. One should appreciate that different combinations of these components can achieve similar results. However, the following guidelines have been developed in order to successfully prepare a sprayable latex aerosol composition according to this invention.

In the present invention, the preferred valving mechanism is one which contains a vapor tap. A vapor tap is a small hole placed at the base of the valve, inside the pressurized container, which operates so as to draw vapor into the valve as the paint is drawn through the dip tube. Typical circular cross section vapor taps range in diameter from about 0.008 inch to about 0.030 inch. For the present invention, a vapor tap of about 0.010 to about 0.025 inch is preferred.

Selection of the actuator is likewise important. Actuators are the tip which is either inserted into the valve or placed on the valve stem and which thus release the paint from the can when pressed. Two types of actuators exist: "mechanical break-up" and "non-mechanical break-up" actuators. Again, reference is made to U.S. Pat. No. 5,340,871 for a discussion of the differences between these two types of actuators. For the present invention, either a mechanical breakup or non-mechanical breakup actuator with a fan spray orifice is preferred.

Preferred combinations of valves and actuators are as follows:
1. Seaquist NS-34 valve with a 2x.020 stem orifice, 0.020 vapor tap, butyl gasket with 1201-05480 or 0402-05480 actuator having 0.016 to 0.020 inch orifice.
2. Precision Aquasol® valve with 2x.020 orifice, 0.060 inch housing and butyl gasket with Precision Aqua-Delta® mechanical breakup actuator having 0.016 to 0.020 inch inserts.
3. Seaquist AR-83 valve with 0.020 inch vapor tap using 0.060 inch capillary dip tube and butyl gasket with Seaquist 802 actuator with fan spray insert (2 piece, gentle mist having 0.016 inch midorifice and 0.016–0.020 inch orifice).
4. Danvern 900 valve with 0.018–0.024 inch vapor tap.

The amount of propellant used should be sufficient to enable the user to dispense the contents of the container upon operation of the valve. Generally, the amount of propellant used is between about 25% and about 50% by weight of the contents of the container. In the present invention, the amount of propellant used is between about 30% and 40% by weight. This generally yields an initial pressure in the container of between about 60 pounds per square inch and about 85 pounds per square inch at room temperatures of between 65 F and 75 F.

The most preferred propellant for use with water-based latex aerosol paint compositions that does not cause excessive foaming is dimethyl ether. This is generally used alone, although amounts of propellant 134a and/or 152a up to about 10% of the total can weight can be included.

The following examples describe a procedure for preparing aerosol paints according to the present invention. It should be appreciated that these examples are representative and it should be appreciated that other procedures may produce acceptable results.

EXAMPLE I

Bulk Paint Preparation

A sample black gloss bulk paint composition can be prepared using the following ingredient list:

Grind Phase:

| Ingredient | Pounds | Gallons |
| --- | --- | --- |
| Joncryl 537 Latex Resin | 200.00 | 22.8571 |
| Amp 95 Can and pH stabilizer | 10.00 | 1.2738 |
| Nalco 2305 Defoamer | 2.00 | 0.2439 |
| G-3300 Grinding Aid | 1.50 | 0.1748 |
| Furnace Black Raven 14 Pigment | 15.00 | 1.00 |

The above are ground to a value of 7 Hegman.
Letdown Phase:

| Ingredient | Pounds | Gallons |
| --- | --- | --- |
| Joncryl 537 Latex Resin | 488.3375 | 55.81 |
| Nalco 2302 Defoamer | 2.00 | 0.2564 |
| 2-butoxy ethanol | 55.00 | 7.3431 |
| Texanol | 14.00 | 1.7676 |
| Aromatic Naphtha | 11.00 | 1.4864 |
| Paraplex WP-1 Plasticizer | 12.00 | 1.4285 |
| Byk 346 Flow and Levelling Agent | 1.00 | 0.1207 |
| Deionized Water | 31.50 | 3.7951 |
| Sodium Benzoate Can Corrosion Inhib. | 3.50 | 0.7337 |
| JonWax 26 Resin | 14.00 | 1.7073 |

The letdown ingredients are added directly to the Grind Phase ingredients and thoroughly mixed under agitation to produce the bulk paint composition.

EXAMPLE II

Latex Aerosol Paint Composition

A sample Gloss Black latex aerosol paint formula is as follows:

| Ingredient | Percentage (by weight) |
| --- | --- |
| Bulk Paint from Example I | 46.0 |
| Nalco 2300 Defoamer | 0.2 |
| 2-butoxy ethanol | 3.0 |
| Isopropanol | 5.0 |
| Deionized Water | 10.8 |
| Dimethyl Ether Propellant | 35.0 |
| | 100.0 |

Generally, the first five ingredients are charged to a standard aerosol can. A valve cup with valve assembly and dip tube are added. The container is either sealed and the propellant charged through the valve or the container is charged with propellant under the valve cup after which it is sealed to the can. An actuator is then added.

What is claimed is:

1. A pressurized aerosol paint product comprising:
   a. a container; said container comprising a can, a valve cup with valve assembly, a dip tube and an actuator; and
   b. a composition within said container; said composition comprising a water-based inverted core-shell latex resin and a propellant comprising dimethyl ether wherein said propellant is in contact with at least a portion of said water based latex resin;
   and wherein the composition is free of added thickener.

2. The product of claim 1 wherein said water-based latex resin is an inverted core-shell latex resin obtained by a multistage polymerization process wherein the second stage polymer is encapsulated by a more hydrophilic first stage polymer.

3. The product of claim 1 wherein the first stage polymer of said water-based latex resin is obtained by polymerizing a mixture of monomers comprising at least one monomer which would produce a water insoluble polymer and at least one monomer capable of contributing a functional group to the polymer.

4. The product of claim 3 wherein in the first stage polymer, the monomer for producing a water insoluble polymer is selected from the group consisting of vinyl monomers, acrylic and methacrylic esters, hydroxy functional acrylates, methylol acrylamide, glycidyl acrylate and methacrylate and mixtures thereof.

5. The product of claim 4 wherein in the first stage polymer the monomer capable of contributing a functional group to the polymer is selected from the group consisting of acrylic acid, methacrylic acid, maleic acid, crotonic acid, fumaric acid, itaconic acid, vinyl benzoic acid and isoprenyl benzoic acid.

6. The product of claim 5 wherein the first stage polymer comprises α-methylstyrene and acrylic acid.

7. The product of claim 2 wherein the second stage polymer of said water-based latex resin is not water soluble.

8. The product of claim 7 wherein the second stage polymer of said water-based latex resin is obtained by polymerizing a mixture of monomers comprising monomers selected from the group consisting of vinyl monomers, acrylic and methacrylic esters, hydroxy functional acrylates, methylol acrylamide, glycidyl acrylate and methacrylate and mixtures thereof.

9. The product of claim 8 wherein the second stage polymer of said water-based latex resin comprises styrene, 2-ethylhexyl acrylate and methyl methacrylate.

10. The product of claim 5 wherein the second stage polymer of said water-based latex resin is not water soluble.

11. The product of claim 10 wherein the second stage polymer of said water-based latex resin is obtained by polymerizing a mixture of monomers comprising monomers selected from the group consisting of vinyl monomers, acrylic and methacrylic esters, hydroxy functional acrylates, methylol acrylamide, glycidyl acrylate and methacrylate and mixtures thereof.

12. The product of claim 11 wherein the second stage polymer of said water-based latex resin comprises styrene, 2-ethylhexyl acrylate and methyl methacrylate.

* * * * *